No. 744,776. PATENTED NOV. 24, 1903.
G. W. MARBLE.
POWER TRANSLATING DEVICE.
APPLICATION FILED JAN. 19, 1903.
NO MODEL. 3 SHEETS—SHEET 1.
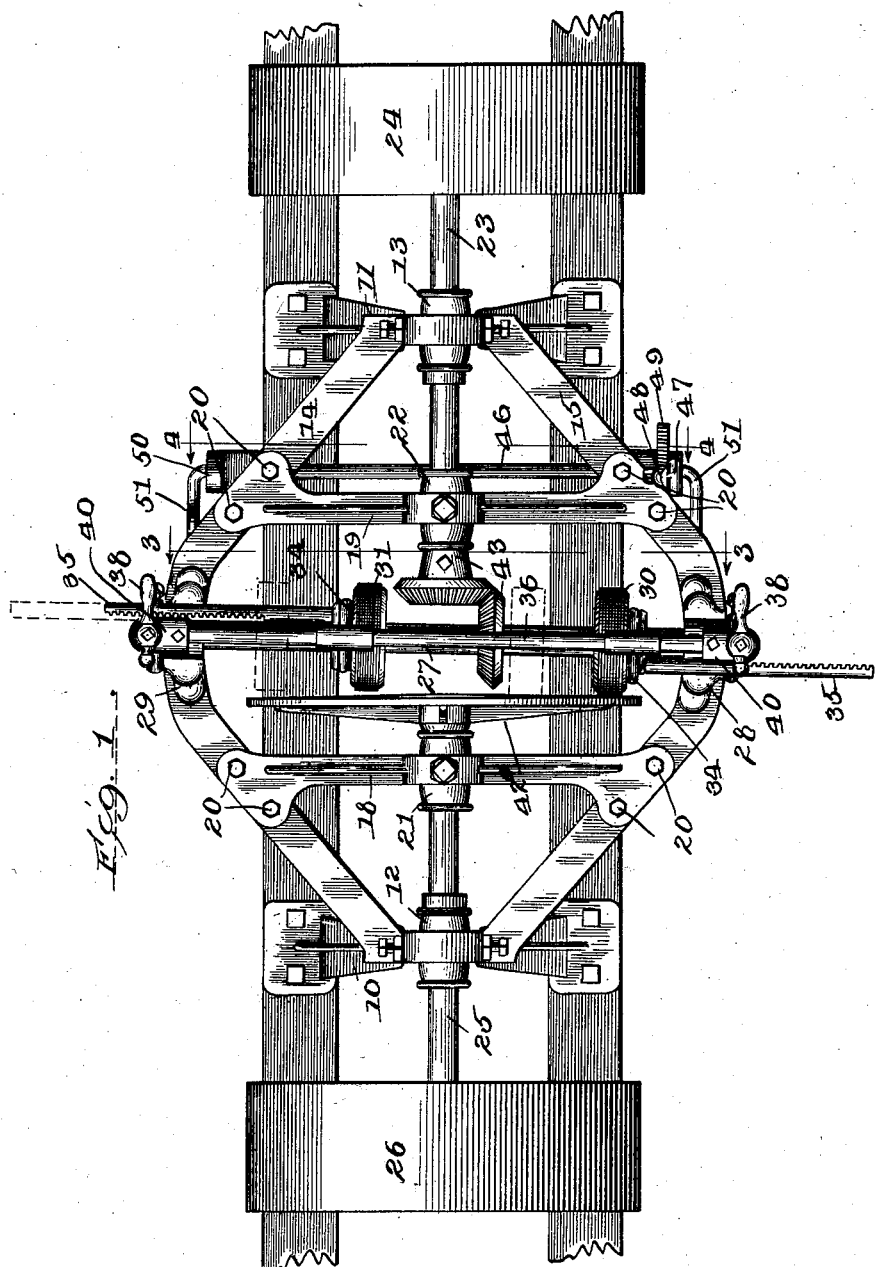
Witnesses:
Harry B. White
Ray White.
Inventor:
George W. Marble.
By Bree Bain
Attorney No. 744,776. PATENTED NOV. 24, 1903.
G. W. MARBLE.
POWER TRANSLATING DEVICE.
APPLICATION FILED JAN. 19, 1903.
NO MODEL. 3 SHEETS—SHEET 2.
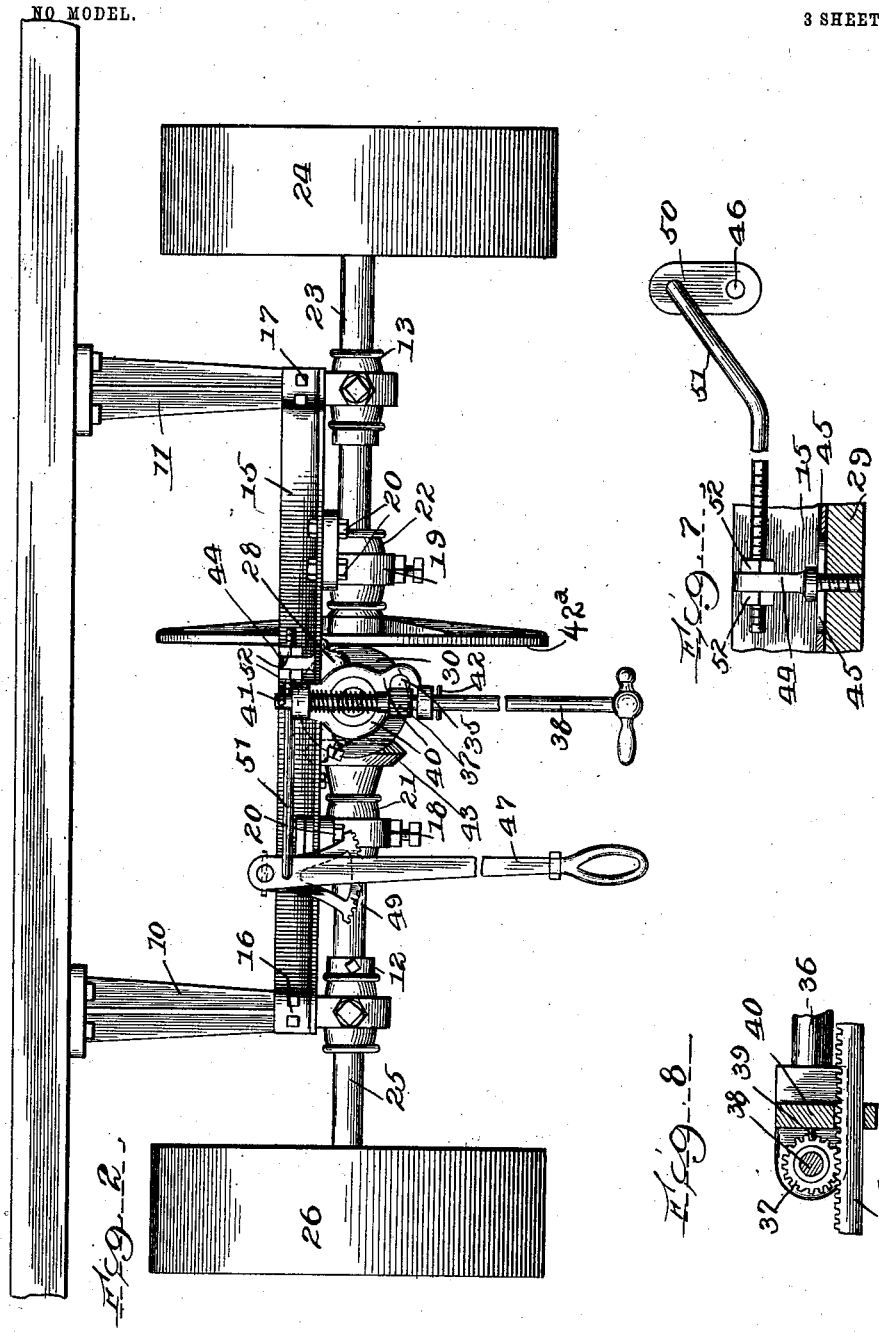

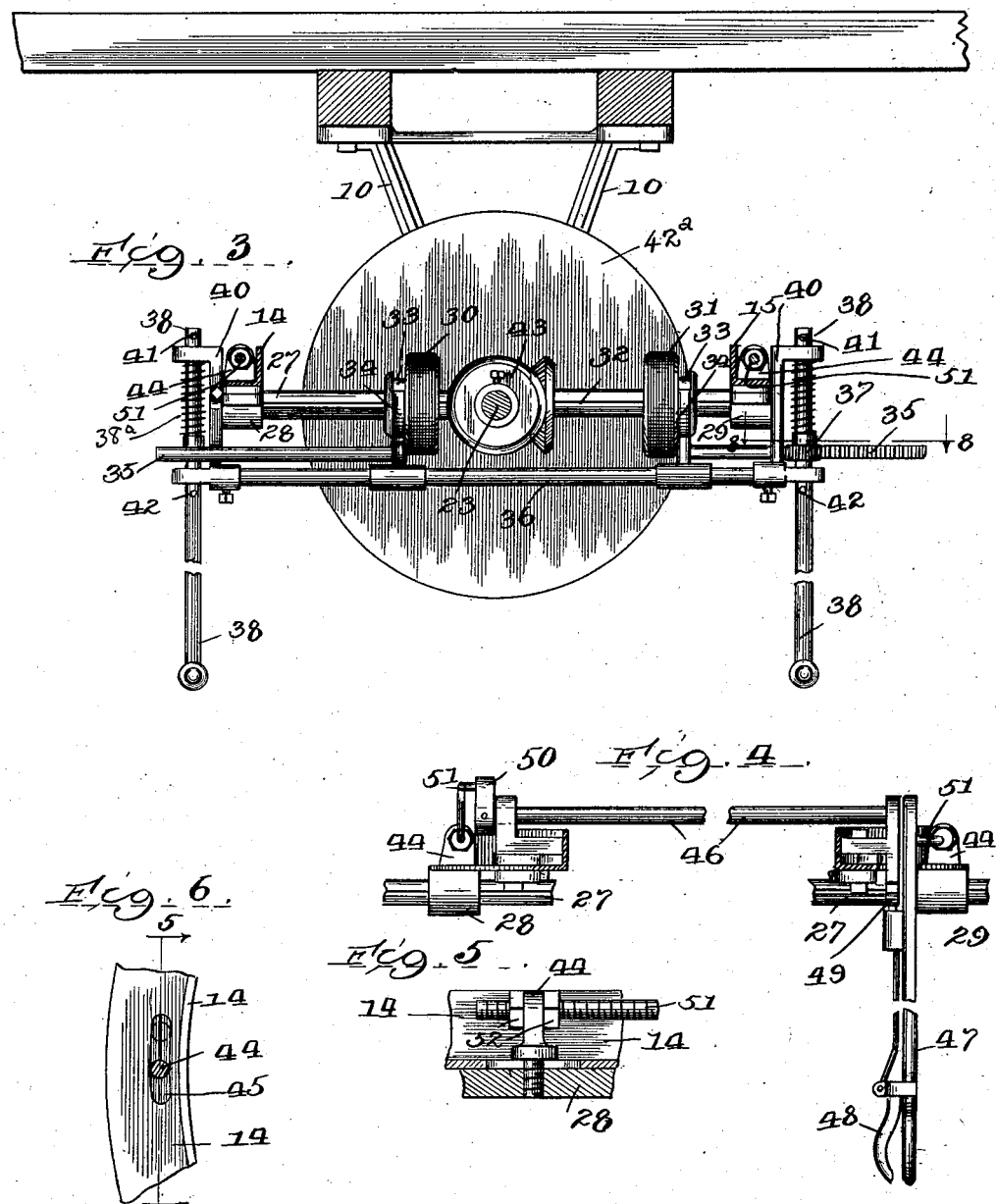

No. 744,776. Patented November 24, 1903.

UNITED STATES PATENT OFFICE.

GEORGE W. MARBLE, OF BUCHANAN, MICHIGAN, ASSIGNOR TO MARBLE-SWIFT AUTOMOBILE CO., A CORPORATION OF ARIZONA TERRITORY.

POWER-TRANSLATING DEVICE.

SPECIFICATION forming part of Letters Patent No. 744,776, dated November 24, 1903.

Application filed January 19, 1903. Serial No. 139,688. (No model.)

*To all whom it may concern:*

Be it known that I, GEORGE W. MARBLE, of Buchanan, in the county of Berrien and State of Michigan, have invented certain new and useful Improvements in Power-Translating Devices; and I hereby declare that the following is a full, clear, and exact description thereof, reference being had to the accompanying drawings, which form part of this specification.

My invention relates to improvements in power-translating devices.

The object of my invention is to provide a power-translating device or variable-speed counter-shaft to be used intermediate of a driving-shaft and a tool or machine to be driven whereby the speed of the driven machine may be varied in gradations of small value from the minimum speed to the highest speed within the capacity of the translating counter-shaft and whereby these results may be obtained from a source of power of constant velocity, such as a main driving-shaft in a power plant or other motor.

Another object of my invention is to provide a counter-shaft or intermediate translating device whereby the direction of rotation may be instantly changed and whereby the speed at which the device will be operated when the direction of rotation is changed may be predetermined by a proper adjustment, so that the speed may be predetermined in accordance with the adjustment.

Another object of my invention is to provide a device whereby the rate of velocity of the driven machine may be varied during the time when the said machine is in rotative motion.

Another object of my invention is to provide a device of the kind described whereby the speed of rotation may be quickly and positively checked, whereby a machine or tool driven by the said counter-shaft may be instantly and quickly stopped.

With these and other objects in view, which may hereinafter appear and become apparent to those skilled in the art, my invention consists in the arrangement and combination of the parts, as hereinafter described, and more specifically pointed out in the appended claims.

In the drawings, Figure 1 is a plan view of an embodiment of the device looking from the bottom when the said device is in position for operation. Fig. 2 is a side elevation of the same. Fig. 3 is a transverse section taken on lines 3 3 of Fig. 1 looking in the direction of the arrows. Fig. 4 is a broken-away transverse section taken on lines 4 4 of Fig. 1 looking in the direction of the arrows. Figs. 5 and 6 are enlarged broken-away details of the parts used for shifting the bearings of the intermediate shaft and for guiding the same when moving them into position. Figs. 7 and 8 are enlarged broken-away details of the parts hereinafter more specifically referred to.

In all the views the same figures of reference indicate similar parts.

10 and 11 are shaft hangers or supports for the bearings of the coaxially-arranged shafts, supporting the bearings 12 and 13, respectively. A frame composed of the pieces 14 and 15 is supported by the said hangers, as shown by 16 and 17 of Fig. 2. Cross-pieces 18 and 19 are fixed to the side pieces of said frame by means of the bolts 20 and support-bearings 21 and 22, respectively.

A shaft 23, preferably the driving-shaft, is supported in the bearing-boxes 13 and 22 and carries a pulley 24, which is designed to be connected to the source of power. A shaft 25, preferably the driven shaft, is supported in the boxes 12 and 21 and carries a pulley 26, which is designed to be connected to the machine to be driven. An intermediate transverse shaft 27 is supported in the slidable bearings 28 and 29. Friction-wheels 30 and 31 are carried by the shaft 27 and rotatively engaged therewith by means of the spline or feather 32. The said wheels are adapted to be independently and longitudinally moved along the length of the shaft. Each of the friction-wheels is provided with a groove 33, into which a fork 34 projects, the said fork being a portion of the rack-rod 35, both of which are guided upon the rod 36 and moved longitudinally by means of the pinions 37, which are turned by the depending handles 38 38. A fixed pin 39 projects between the teeth of the pinion 37 and forms a lock to hold the pinion in a fixed position. A spring 38ª surrounds the rod 38 and abuts against the upper end of the bracket 40, and the pinion 37 holds the rod 38 in a depressed position. Pins 41 and 42 confine the rod 38, so that it has a definite vertical movement. To oscillate the rack 35 by means of the pinion 37, it is necessary to lift the rod 38 until the pin 39 clears the geared pinion 37, when the said pinion may be rotated and the rack 35 oscillated for the purpose of moving either of the friction-wheels 30 and 31 across the face of the friction-disks.

A friction-disk 42ª is fixed to the shaft 25. Against the face of the disk the friction-wheels 30 and 31 are adapted to make peripheral contact for the purpose of rotating the said shaft. The transverse shaft 27 is rotated, by means of the shaft 23, through the miter-gear 43. The friction-wheels 30 and 31 may be separately brought into contact with the friction-disk 42ª by shifting the bearings 28 and 29 to and from the disk.

44 is a stud which extends through the slot 45 in the frame part 15 into the shaft-bearings 28.

A shaft 46 is adapted to be oscillated by means of the handle 47 and to be held in fixed position by means of the latch 48, engaging with the notched segment 49. A crank-arm 50 is provided on one end of the shaft 46, and the handle 47 extends from the crank-arm 50, which projects in the opposite direction and is located on the opposite end of the shaft 46. To these crank-arms rods 51 are attached. The fixed ends of these rods are screw-threaded and are adjustably connected to the studs 44 by means of the nuts 52. When the shaft 46 is oscillated in a given direction, the crank-arms 51 will move one of the studs 44 in one direction—as, for instance, toward the disk 42—and the crank-arm on the opposite end of the shaft 46 will move the stud 44 in the opposite direction, whereby the intermediate transverse shaft 27 will be placed at an angle to the face of the disk 42, so that the friction-wheel 30 or 31, as desired, may be brought into peripheral contact with the face-surface of the said disk.

Fig. 1 shows the respective positions to which the friction-wheels 30 and 31 may be moved across the face of the friction-disk for the purpose of varying the speed of the driven shaft and for the purpose of varying the direction of rotation of the said shaft, as may be desired.

The use and operation of my device are as follows: The handle 47 is normally in a vertical position, whereby the shaft 27 is placed and held practically at right angles to the shafts 23 and 25. The wheels 30 and 31 are then out of contact with the friction-disk 42. At this time the pulley 24 and the shafts 23 and 27 are constantly rotated at a uniform speed by means of the belt connecting the same with the main driving-shaft or other source of constantly-moving power. At the same time the shaft 25, the pulley 26, and the disk 42ª are stationary and not being rotated. When it is desired to rotate the pulley 26 at the lowest speed at which it is designed to be revolved, the friction-wheel 30 is placed in the position of longest radius, as shown in Fig. 1 of the drawings. The lever-handle 47 is moved on its fulcrum to accomplish this result, so as to bring the friction-wheel 30 into contact with the face of the friction-disk 42ª. If now it is desired to rotate the shaft 25 at the lowest speed in the opposite direction to that heretofore referred to, the friction-wheel 31 should be placed with reference to the radius of the friction-disk in the same radial position as that shown with respect to friction-wheel 30, but upon the opposite side of the axis of said disk and the lever 47 moved in the opposite direction to that in the first instance, so that the friction-wheel 31 will be brought thereby into contact with the friction-disk 42ª. Then said disk and the shaft to which it is connected will be rotated in the direction opposite to that of the first illustration. If now it is desired to rotate the driven shaft at the highest speed within the compass of the device in a given direction, the friction-wheel 31 should be placed in the position indicated in full lines in Fig. 1. The handle 47 must be moved so that the said friction-wheel 31 will be brought into peripheral contact with the face of the friction-disks 42ª, when the driven shaft 25 will then be rotated by virtue of the frictional contact of the wheel 31 with the disk 42ª at the highest speed within the compass of the device. If it is desired to reverse the direction of rotation and to rotate the shaft 25 at the highest speed in the reverse direction, the wheel 30 should be moved along the shaft 27 in the position shown in dotted lines, which is the same radial position as that occupied by the friction-wheel 31, and the friction-wheel 30 should then be brought into peripheral contact with the face of the driven disk 42ª, and the said disk will then be rotated at the highest speed in the opposite direction. To move the friction-wheels 30 and 31 along the shaft 27, it is necessary to raise the handle 38 until the pin 39 clears the pinion 37. The handle should then be rotated, and the rack 35 will be reciprocated for the purpose of moving the said friction-wheels transversely across the face of the disk 42ª. It will be noticed that the friction-wheels 30 and 31 may be independently moved or adjusted. Either of the friction-wheels may be adjusted to a given point along the shaft 27 and may be subsequently brought into contact with the friction-disk, at which time the said friction-disk will be rotated thereby at a speed that may be predetermined by the location of the said wheel along the shaft 27. When the handle 38 is released, after the adjustment of the respective wheels have been accomplished the spring 41 will depress the handle until the pinion 37 once more engages the pin 39, when the said pinion will thereby be locked and held in position against rotation.

As shown in Fig. 1, the wheels 30 and 31 occupy positions whereby the shaft 25 will be driven at the lowest speed of rotation in one direction and at the highest speed of rotation when the direction of rotation is reversed by the operation of the handle 47, as heretofore explained.

When my counter-shaft is used with a machine requiring a quick return—such, for instance, as a lathe—such an adjustment can be made to an advantage by means of which the cut by the lathe may be made at the proper speed and the cutting-tool returned when the speed of rotation is reversed at a higher speed, as will be readily understood by those skilled in the art. It is also evident that the friction-wheel 30 or 31 may be moved inwardly or outwardly from the positions shown in the drawings during the time when the said friction-wheel is driving the disk 42$^a$, by means of which the speed of the driven shaft may be gradually and slowly increased or decreased, as the case may be, while the said device is in operation. This is very desirable when the device used in connection with the lathe, as when a disk or wheel is being faced off the speed of rotation of the said disk or wheel may be gradually increased as the tool nears the axis of rotation, so that the cutting speed of the tool may be maintained practically constant during the entire cut and a smooth surface thereby produced.

Both friction-wheels 30 and 31 are not essential to the operation of my device, either of which may be used separately.

Considerable variation from that shown in the drawings, which I have used to illustrate the embodiment of my invention, may be made without departing from the spirit and scope thereof.

Having described my invention, what I claim as new, and desire to secure by Letters Patent of the United States, is—

1. In a power-translating device the combination of two coaxially-arranged shafts, an intermediate transverse shaft arranged and adapted to be driven by one of the first-mentioned shafts, a friction-disk carried by the other one of the said shafts, a friction-wheel carried by the transverse shaft, and a means for effecting frictional engagement of said wheel with said disk.

2. In a power-translating device the combination of two coaxially-arranged shafts, an intermediate transverse shaft, a driving-gear connecting said intermediate transverse shaft with one of the first-mentioned shafts, a friction-disk carried by the other one of said shafts, two friction-wheels carried by and rotatively connected with said transverse shaft, a means for independently moving said wheels longitudinally on said intermediate shaft, and a means for effecting frictional engagement of either of said wheels with said disk.

3. In a power-translating device the combination of two coaxially-arranged shafts, an intermediate transverse shaft, miter-gears connecting said transverse shaft with one of the first-mentioned shafts, a friction-disk carried by the confronting end of the other one of said shafts, two friction-wheels carried by and rotatively connected with said transverse shaft, one on each side of said miter-gear, a means for independently moving said friction-wheels longitudinally on said intermediate transverse shaft, movable bearings for supporting said transverse shaft and a means for moving said bearings simultaneously, in opposite directions, to effect frictional driving contact of either one or the other of the friction-wheels with the said disk.

4. In a power-translating device the combination of a driving-shaft 23 adapted to be rotated at a constant speed, a driven shaft 25, adapted to be rotated at a variable speed in either direction, a friction-disk 42$^a$ fixed to said driven shaft, an intermediate transverse shaft 27 loosely mounted in front of said disk, a train of gears 43 for rotating shaft 27, friction-wheels 30 and 31 carried by and rotatively connected with shaft 27, handle 38 and connecting mechanism for moving said friction-wheels longitudinally on shaft 27, one for each wheel, and handle 47 and connecting mechanism for simultaneously shifting the ends of shaft 27 in opposite directions for effecting frictional driving contact of either one of the friction-wheels with the friction-disk.

5. In a power-translating device the combination of a disk 42$^a$, a friction-wheel 30 arranged to make peripheral contact with the face thereof, a shaft 27 for rotating said wheel and upon which said wheel is adapted to be longitudinally moved, a sliding rack-arm 35 for moving said wheel, a pinion 37 for moving said arm, and a lock 39 for retaining said pinion in a fixed position.

6. In a power-translating device the combination with a frame consisting of side pieces 14 and 15, and cross-pieces 18 and 19, of hanger-bearing supports 10 and 11, coaxially-arranged shafts 23 and 25, a transverse shaft 27, two friction-wheels loosely mounted on said shaft, one at each end, a disk 42$^a$ on the confronting end of one of the coaxially-arranged shafts, a connection between the other shaft and the transverse shaft for rotating the latter, and a means for moving the transverse shaft to effect frictional contact of said friction-wheel with said disk.

7. In a power-translating device the combination with the shaft 27, movable shaft-bearings 28 and 29 for supporting said shaft, a shaft 46, a handle 47 for rocking said shaft, and connections between shaft 46 and bearings 28 and 29 for moving the ends of the shaft 27 in opposite directions.

In testimony that I claim the foregoing as my own I affix my signature in presence of two witnesses.

GEORGE W. MARBLE.

In presence of—
GEO. P. SWIFT,
W. C. BURRELL.